United States Patent
Contini et al.

(10) Patent No.: US 11,725,537 B2
(45) Date of Patent: Aug. 15, 2023

(54) DEVICE FOR COOLING A TURBINE CASING WITH AIR JETS

(71) Applicant: SAFRAN AIRCRAFT ENGINES, Paris (FR)

(72) Inventors: Nicolas Contini, Moissy-Cramayel (FR); Laurent Claude Descamps, Moissy-Cramayel (FR); Rémy Miled Michel Haynau, Moissy-Cramayel (FR); Maria Goossens, Moissy-Cramayel (FR); Benoit Guillaume Silet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 19 days.

(21) Appl. No.: 17/761,337

(22) PCT Filed: Sep. 23, 2020

(86) PCT No.: PCT/FR2020/051654
§ 371 (c)(1),
(2) Date: Mar. 17, 2022

(87) PCT Pub. No.: WO2021/058908
PCT Pub. Date: Apr. 1, 2021

(65) Prior Publication Data
US 2022/0341347 A1 Oct. 27, 2022

(30) Foreign Application Priority Data
Sep. 23, 2019 (FR) ...................................... 1910476

(51) Int. Cl.
*F01D 25/12* (2006.01)
*F01D 25/24* (2006.01)

(52) U.S. Cl.
CPC ............. *F01D 25/12* (2013.01); *F01D 25/24* (2013.01); *F05D 2220/30* (2013.01); *F05D 2240/14* (2013.01); *F05D 2260/201* (2013.01)

(58) Field of Classification Search
CPC .......... F01D 25/12; F01D 25/24; F01D 11/24; F05D 2220/30; F05D 2240/14;
(Continued)

(56) References Cited

U.S. PATENT DOCUMENTS 6,149,074 A * 11/2000 Friedel .................... F01D 11/24
165/169
7,597,537 B2 * 10/2009 Bucaro ................... F01D 11/24
415/173.2
(Continued)

FOREIGN PATENT DOCUMENTS

EP 0156269 A2 10/1985
EP 0156269 A3 9/1987
(Continued)

OTHER PUBLICATIONS

International Search Report dated Nov. 10, 2020 in International Application No. PCT/FR2020/051654.
(Continued)

*Primary Examiner* — Igor Kershteyn
(74) *Attorney, Agent, or Firm* — Sughrue Mion, PLLC

(57) ABSTRACT

An air-jet cooling device for a casing of a turbomachine, in particular a turbine casing, including a cooling air housing having a wall, and a tube having a first end mounted on the wall of the housing so as to put the tube into fluid communication with the housing, orifices being formed in a wall of the tube in order to eject the cooling air coming from the housing on the casing. The tube has a section at the first end with a gradual variation that defines a boss. The boss has a curved surface to be immersed in the cooling air so as to (Continued)

avoid a detachment of a boundary layer of the cooling air at an interface between the first end of the tube and the housing.

12 Claims, 4 Drawing Sheets

(58) Field of Classification Search
CPC ......... F05D 2250/324; F05D 2250/323; F05D 2260/201; F05D 2270/17; Y02T 50/60
See application file for complete search history.

(56) References Cited

U.S. PATENT DOCUMENTS 8,869,539 B2 * 10/2014 Daguenet ................ F01D 11/24
60/806

2014/0030066 A1 * 1/2014 Schimmels ............. F01D 11/24
415/116
2018/0128120 A1 * 5/2018 Prestel .................... F01D 25/24
2019/0093559 A1 * 3/2019 Bunel ..................... F01D 11/20

FOREIGN PATENT DOCUMENTS

| EP | 3318725 A1 | 5/2018 |
| FR | 2977276 B1 | 12/2016 |
| FR | 3050228 A1 | 10/2017 |
| WO | 2016/068855 A1 | 5/2016 |

OTHER PUBLICATIONS

French Search Report dated Apr. 22, 2020 in French Application No. 1910476.
Written Opinion of the International Searching Authority dated Nov. 10, 2020 in International Application No. PCT/FR2020/051654.

* cited by examiner

DEVICE FOR COOLING A TURBINE CASING WITH AIR JETS

CROSS REFERENCE TO RELATED APPLICATIONS

This application is a National Stage of International Application No. PCT/FR2020/051654, filed Sep. 23, 2020, claiming priority to French Patent Application No. 1910476, filed Sep. 23, 2019, the contents of each of which being herein incorporated by reference in their entireties.

FIELD OF THE INVENTION

The present invention relates to the field of cooling a casing of a turbomachine. More specifically, the invention relates to a device for cooling with air jets a turbine casing of a bypass turbomachine, in particular a low-pressure turbine casing.

The invention also relates to a turbomachine equipped with such a cooling device.

STATE OF THE ART

In a manner known per se, a bypass turbomachine 1 generally comprises, from upstream to downstream in the direction of flow of the gases in the turbomachine, a fan 2 which may optionally be ducted and housed in a fan casing, an annular primary flow path and an annular secondary flow path. The air mass sucked by the fan 2 is therefore divided into a primary stream which circulates in the primary flow path and a secondary stream, concentric with the primary stream, which circulates in the secondary flow path.

The primary flow path passes through a primary body comprising one or several compressor stages 3, 4, for example a low-pressure compressor 3 and a high-pressure compressor 4, a combustion chamber 5, one or several turbine stages 6, 7 for example a high-pressure turbine 6 and a low-pressure turbine 7 and a gas exhaust nozzle.

Typically, the high-pressure turbine 6 drives in rotation the high-pressure compressor 4 via a first shaft, called high-pressure shaft, while the low-pressure turbine 7 drives in rotation the low-pressure compressor and the fan 2 via a second shaft, called low-pressure shaft.

The turbines 6, 7 are made in the form of a succession of stages each comprising a moving blade impeller (rotor) rotating in front of a stationary blade impeller (stator or distributors).

The low-pressure turbine 7 of a turbomachine 1 is surrounded by a substantially frustoconical casing C of generally flared shape. In order to guarantee high efficiency in the turbomachine 1, it is necessary to limit the air stream not passing through the moving impellers of the different stages, that is to say to limit the leaks between the radially outer ends of the blades and the facing ring made of abradable material. For that, it is necessary to control the clearance at this interface, this clearance being dependent on the temperature of the casing C and in particular the areas of said casing C including the hooks or clamps supporting the abradable material ring.

Usually, this casing C is cooled by using air-jet cooling technology (also known as impact cooling). For that, the casing C is equipped with one or several pressurized air supply housings B, each connected to several cooling ramps R.

In the exemplary embodiment represented in the figures, the casing C is equipped with two housings B positioned at approximately 180° from each other (only one being shown in FIG. 2). In addition, each housing B is equipped with five ramps R, with two tubes T per ramp, each tube extending over approximately 90°. The tubes T as well as the housing B are pierced with a series of orifices O opening out in line with the external surface of the casing. The pressurized air passing through these orifices O thus ensures a ventilation of the casing C with air jets.

Usually, each tube T is connected to the housing via a cylindrical sleeve, each tube T being brazed into the sleeve.

However, in order to sufficiently cool the casing C, particularly during the most restrictive flight phases such as take-off, it is necessary to take a sufficient amount of cold air upstream of the turbine (generally, at the compressor stages) to ensure a sufficient impact pressure. However, such a sampling has necessarily a negative impact on the performances of the turbomachine 1.

DISCLOSURE OF THE INVENTION

One aim of the invention is to solve the drawbacks of the prior art. The objective of the invention is therefore in particular to propose a device for cooling with air jets the casing of a turbomachine, in particular a turbine casing, which improves the cooling of the casing while reducing the impact on the performances of the turbomachine.

To this end, there is proposed, according to a first aspect of the invention, an air-jet cooling device for a casing of a turbomachine, in particular a turbine casing, comprising:
  a cooling air supply housing having a wall,
  at least one tube having a first end mounted on the wall of the housing so as to put the tube into fluid communication with the housing, a plurality of orifices being formed in a wall of the tube in order to eject the cooling air coming from the housing on the casing.

The cooling device further comprises a gradual section variation in the tube at the first end defining a boss, said boss having a curved surface configured to be immersed in the cooling air so as to avoid a detachment of a boundary layer of the cooling air at an interface between the first end of the tube and the housing.

Some preferred but non-limiting characteristics of the cooling device according to the first aspect are the following, taken individually or in combination:
  the curved surface of the boss has no ridges.
  the gradual section variation defines, from the interface between the first end of the tube and the wall of the housing and in a direction of flow of the cooling air in the tube, a gradually convergent then gradually divergent section.
  the boss has a variable thickness.
  the boss is added and fixed to the first end of the tube or monolithic with the tube and the housing.
  the boss has a housing section narrowing portion which extends in the supply housing.
  the housing section narrowing portion has a section which gradually decreases as moving away from the tube. And/or
  the first end of the tube comprises a frustoconical wall of connection to the wall of the housing, the frustoconical wall having a section which gradually converges from said wall of the housing towards the tube, the boss further comprising a frustoconical wall portion which has a variable thickness and which extends along the frustoconical wall.

According to a second aspect, the invention proposes a turbine of a turbomachine, in particular a low-pressure turbine, comprising an air-jet cooling device as described above.

According to a third aspect, the invention also proposes a turbomachine comprising a turbine, in particular a low-pressure turbine, as described above.

According to a fourth aspect, the invention proposes an aircraft comprising a turbomachine as described above.

DESCRIPTION OF THE FIGURES

Other characteristics, aims and advantages of the invention will emerge from the following description, which is purely illustrative and not limiting, and which must be read in relation to the appended drawings in which.

In all the figures, similar elements bear identical references.

DETAILED DESCRIPTION OF THE INVENTION

Figure 1:
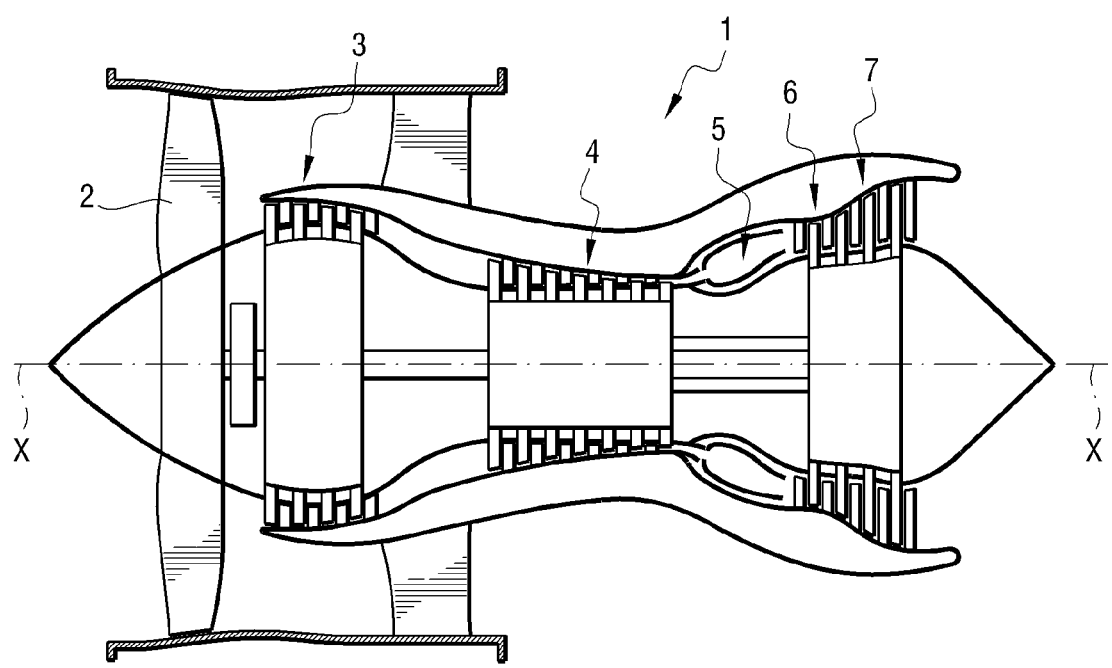
FIG. 1 schematically illustrates a turbomachine 1 in accordance with one embodiment of the invention.
Figure 2:
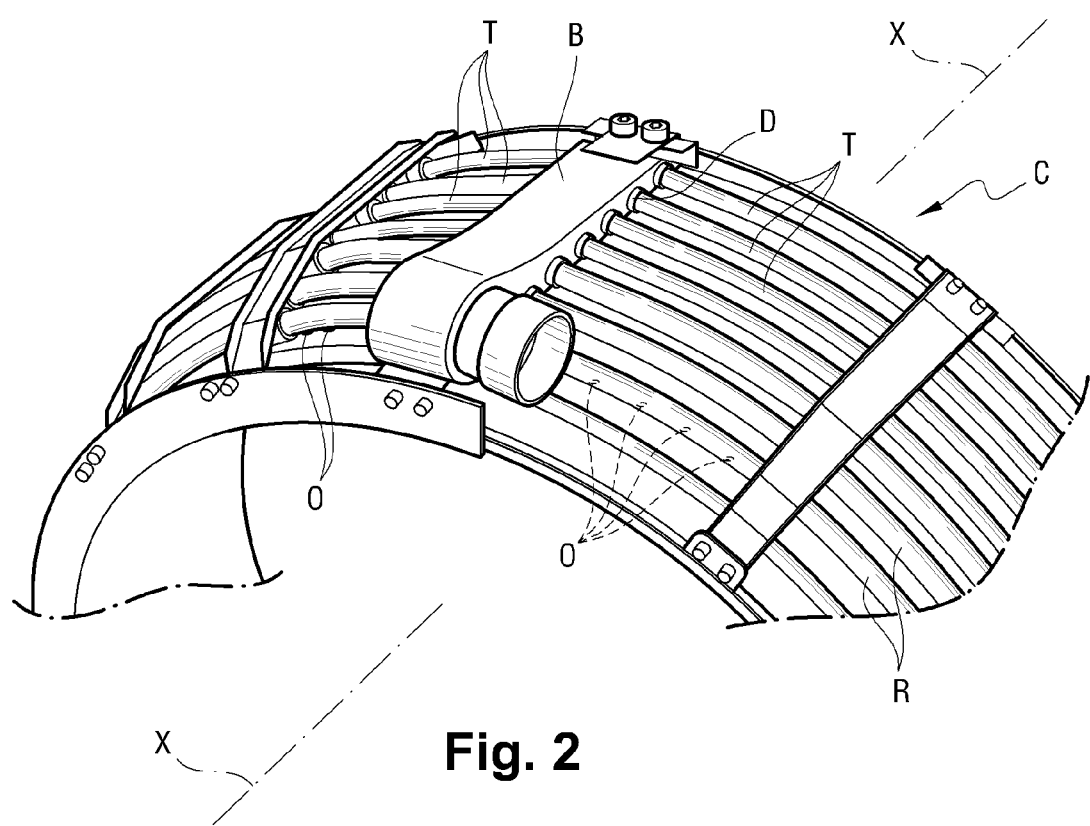
FIG. 2 is a perspective view of part of a device for cooling a low-pressure turbine casing in accordance with one embodiment of the invention.

A cooling device 10 is configured to cool the casing C of a turbine, in particular a low-pressure turbine. A turbine casing C has a flared shape generally comprising several successive frustoconical portions. It has an upstream end and a downstream end. The cooling device 10 is configured to be fixed on an outer surface of the casing C and comprises a pressurized air supply housing B and at least one cooling ramp R. Preferably, the cooling device 10 comprises several ramps, for example eight in number in FIG. 2, distributed around the casing C.

As described above, the casing C can be equipped with two cooling devices, for example with two supply housings B positioned at approximately 180° from each other and whose tubes T of the cooling ramps R extend on either side of this housing B, over approximately 90°. The casing C can also be equipped with four supply housings B, the tubes T of the cooling ramps R then extending over a lesser circumferential extent around the casing C.

The supply housing B forms a channel extending axially relative to the axis X of revolution of the casing C. The tubes T of the ramps therefore extend circumferentially on either side of the housing B.

Each tube T of a cooling ramp R forms substantially curved piping (ring sector) which comprises a first end 11 forming an air inlet which opens out into the channel of the housing B and an opposite second end (not shown in the figures) which is closed. Usually, the section of the tubes T is globally circular. As it will however be seen subsequently, the section of the tubes T can vary locally, in particular at their first end 11.

Each tube T is furthermore pierced with a plurality of air ejection orifices O. The housing B is connected to a pressurized air supply source, not represented in the figures. This housing B is disposed radially outside the external surface of the casing C and at a distance therefrom. In this way, the pressurized cooling air is sent by the supply source in the channel of the housing B, then enters the ramps through the first end 11 of the tubes T before being ejected via the orifices O on the casing C so as to cool it.

In one exemplary embodiment, the housing B can for example be fixed to the casing C using an upstream clamp, itself secured to the upstream end of the casing C and using a downstream clamp, itself secured to the downstream end of the casing C. Other methods for fixing the housing can be envisaged.

In the following, the axis of revolution of the tube T will designate the axis A of symmetry of the tube T at the level of its fixing to the supply housing B. This axis A is therefore substantially perpendicular to the side wall of the housing B and passes through the center of the first end 11. The axial direction corresponds to the direction of the axis A, and a radial direction is a direction perpendicular to this axis and passing therethrough. Similarly, an axial plane is a plane containing the axis A of the tube T and a radial plane is a plane perpendicular to this axis A and passing therethrough. Unless otherwise specified, inner and outer, respectively, are used with reference to a radial direction so that the inner (i.e. radially inner) part or face of an element is closer to the axis A than the outer (i.e. radially outer) part or face of the same element.

The supply housing B comprises a bottom wall, configured to face the outer surface of the casing C and in which one or several cooling passages are generally formed, and a side wall 12 on which the cooling ramps R are mounted.

In one embodiment, each tube T is connected to the side wall 12 of the housing by means of a cylindrical sleeve D, each tube T being brazed in the sleeve D. It will however be noted that this is however not limiting, the tubes T can be connected by a connecting pipe which extends through the housing B, as described for example in document FR 2 977 276 in the name of the Applicant, or by any other suitable means.

Whatever the configuration of the connection between the tubes T of the ramp and the housing B, the interface between the tube T and the housing B comprises on the one hand the side wall 12 of the housing B, in which is formed a hole 13 that allows putting the ramp into fluid communication with the channel of the housing B at the first end 11 of the cooling ramp R. However, the side wall 12 is planar and the first end 11 of the cooling ramp R extends substantially perpendicularly to the side wall 12. It follows that the pressurized air current lines at this interface cannot run along the side wall 12 or the ramp at this interface and that the boundary layer is detached, which creates pressure drops. Particularly, at the level of this detachment, air recirculation areas are formed (see FIG. 3, dotted lines), thus reducing the air pressure at the outlet of the ejection orifices O.

In order to improve the performances of the turbomachine 1, the invention proposes to reduce the pressure drops at the interface between the supply housing B and the cooling ramps R by eliminating the recirculation areas thus identified. For that, the invention proposes to modify the shape of the inner face of the cooling device 10 which is located at the interface between the housing B and the ramps in order to reduce the geometric discontinuities at the interface between the supply housing B and the ramps so that the current lines further conform to the inner face of the cooling device 10.

For that, the cooling device 10 comprises a gradual section variation 20 in the tube T which defines a boss 20 at the first end 11 which has a curved surface 21 configured to be immersed in the cooling air.

Preferably, when the section of the cooling ramp R at the first inlet is circular, the boss 20 is annular and has a symmetry of revolution about the axis A.

Figure 3:
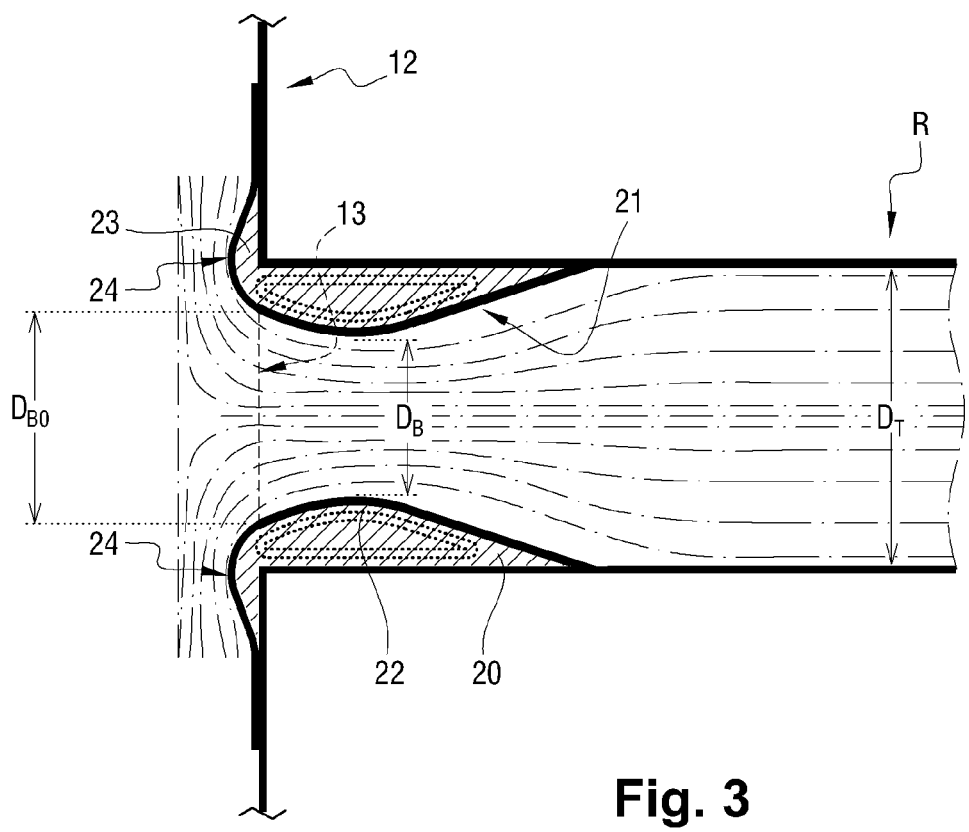
FIGS. 3, 4 and 5 are schematic and partial cross-sectional views of part of a supply housing and of an air inlet of a cooling ramp in accordance with three embodiments of the invention on which pressurized air current lines have been represented in the configuration of the prior art (in dotted lines) and in the configuration of the invention (in solid lines).

In order to prevent the detachment of the pressurized air in the ramp, the curved surface 21 of the boss 20 has, from the interface between the side wall 12 and in the direction of flow of the pressurized air in the cooling ramp R (that is to say from the first end 11 to the second end of the tube T, to the right in FIG. 3), a convergent section then a divergent section. The shape of the surface of the boss 20 approximates in practice the shape of a Laval nozzle.

Thus, the passage section of the pressurized air in the cooling ramp R first gradually decreases to reach a minimum then gradually increases until reaching the section of the tube T downstream of the boss 20. At the divergent section, the thickness of the boss 20 gradually decreases in the direction of the second end of the tube T until reaching a substantially zero thickness so as not to form a geometric discontinuity (such as a ridge) that may detach the pressurized air boundary layer in the cooling ramp R.

In a first embodiment, the boss 20 can only extend in the cooling ramp R and does not continue in the channel of the housing B. In this embodiment, in the plane of the side wall 12 (at the hole 13 of the housing B on which the first end 11 of the tube T is connected), the thickness of the boss 20 therefore decreases until the internal diameter $D_B$ of the boss 20 is substantially equal to the diameter $D_T$ of the tube T downstream of the boss 20. In other words, at the hole 13, the thickness of the boss 20 is substantially zero. In this first embodiment, the boss 20 therefore extends substantially axially along the axis A only.

This configuration may however create pressure drops due to the presence of the ridge present at the interface between the boss 20 and the side wall 12 of the supply housing B.

Figure 4:
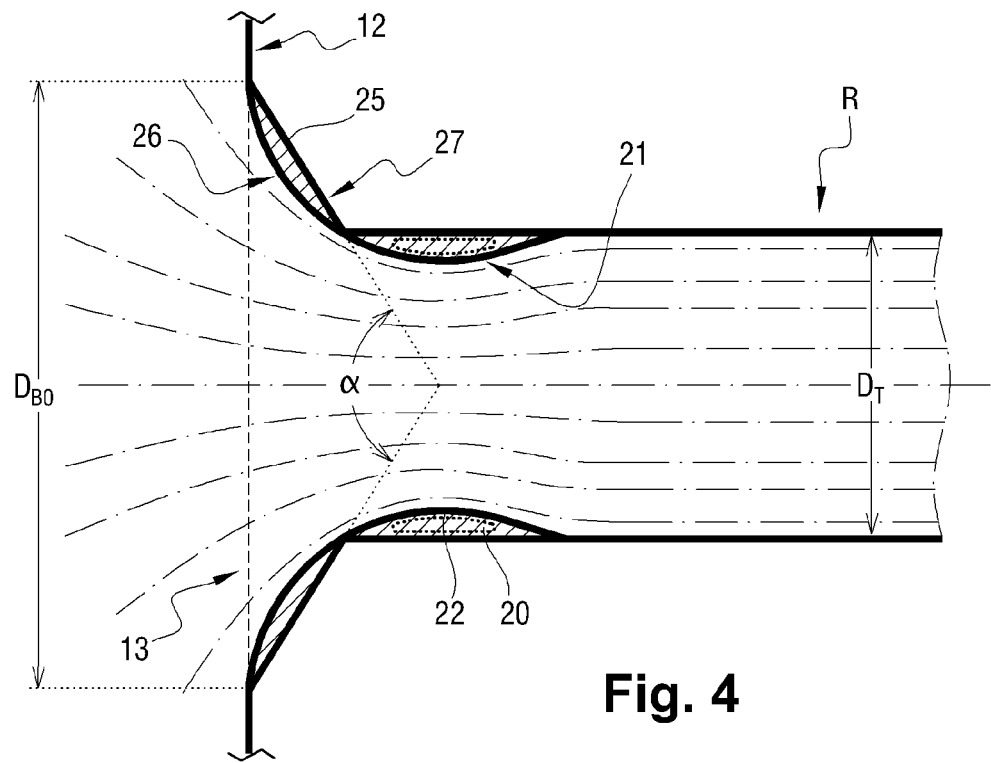
Figure 5:
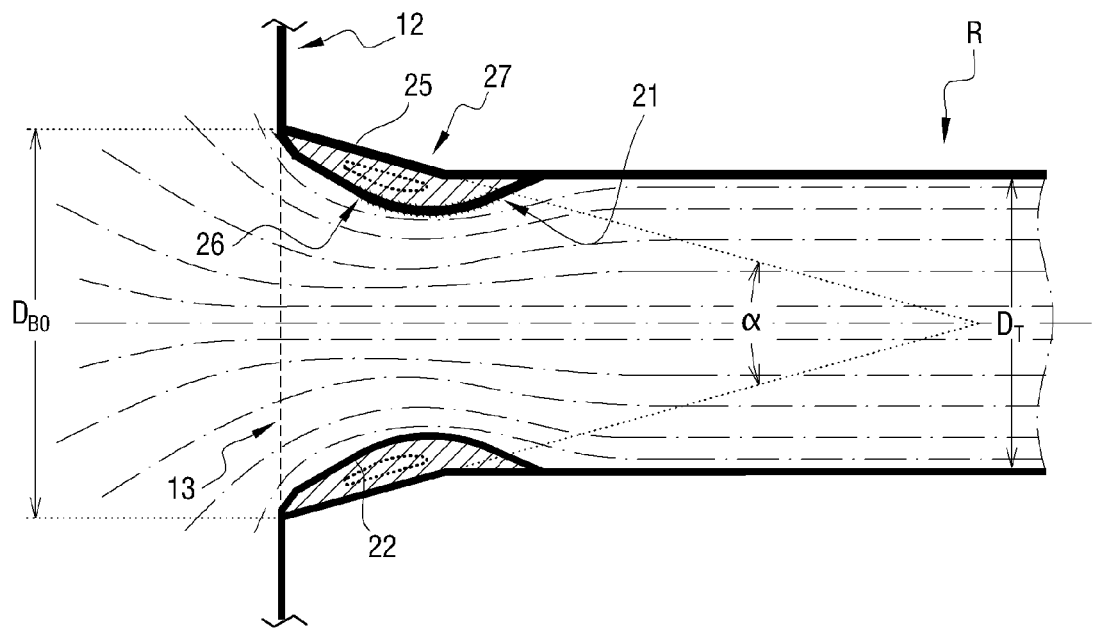

Optionally, as illustrated in FIGS. 4 and 5, the first end 11 of the tube T may also have, at the interface with the wall 12, a duct 25 of frustoconical section having a convergent frustoconical wall 26 whose section decreases (converges) gradually from the wall 12 to the second end of the tube T (that is to say in the direction of flow of the pressurized air in the cooling ramp R). The section of the tube T then becomes globally constant. In this embodiment, the boss 20 then comprises the axial portion 22, which extends in the circular section part of the tube T, downstream of the frustoconical wall 26. The internal diameter $D_B$ of the boss 20 increases gradually along the frustoconical duct 25 up to the hole 12, where the internal diameter $D_{B0}$ of boss 20 in the plane of the side wall 12 is substantially equal to the diameter of the hole 13 formed in the wall 12.

The angle α at the apex of the cone defining the frustoconical duct 25 can be comprised between 60° (FIG. 5) and 120° (FIG. 4) approximately. The higher the angle α, the lower the thickness of the boss 20 in the frustoconical duct 25. Furthermore, when the tube T comprises a frustoconical duct 24, the convergent section of the boss 20 is housed at least partly in the frustoconical duct 24, the divergent section extending in the cylindrical part of revolution. By way of example, when the angle α is on the order of 60° (FIG. 5), only the frustoconical wall 26 comprises the entire divergent section of the boss 20, the axial portion 22 comprising the convergent section. When the angle α is on the order of 120° (FIG. 4), the thickness of the boss 20 is small and the axial portion 22 of the boss 20 comprises part of the divergent section.

This configuration with frustoconical duct 25 thus allows limiting the pressure drops by eliminating the ridge present at the interface between the boss 20 and the side wall 12 of the supply housing B.

In a second embodiment illustrated in FIG. 3, the boss 20 further continues in the cavity of the supply housing B so as to also extend against the side wall 12. This portion of the boss 20 therefore extends substantially radially relative to the axis A from the axial portion 22, which extends within the tube T.

In this embodiment, the axial portion 22 of the boss 20 has a shape similar to that of the axial portion 22 of the first embodiment. Particularly, its curved surface 21 has, from the interface between the side wall 12 and in the direction of flow of the pressurized air in the tube T, a convergent section then a divergent section to approximate the shape of a Laval nozzle.

Furthermore, the thickness of the boss 20 can decrease until the internal diameter $D_{B0}$ of the boss 20 in the plane of the side wall 12 is substantially equal to the diameter $D_T$ of the tube T downstream of the boss 20. Alternatively, as illustrated in the FIG. 3, the internal diameter $D_{B0}$ of the boss 20 in the plane of the side wall 12 may be smaller than the internal diameter $D_T$ of the tube T downstream of the boss 20 in order to better adapt the shape of the boss 20 to the current lines.

The radial portion 23 of the boss 20 extends in the extension of the axial portion 22 of the boss 20. Thus, in the plane of the side wall 12, the internal diameter of the radial portion 23 is equal to the internal diameter $D_{B0}$ of the axial portion 22. The internal diameter of the radial portion 23 of the boss 20 gradually increases from the side wall 12 as moving away from the axial portion 22 (to the left, in FIG. 3) until reaching a maximum corresponding to the axial apex 24 of the radial portion 23. In other words, the curved surface 21 of the radial portion 23 of the boss 20 diverges up to the axial apex 24. Then, in order not to form a geometric discontinuity, the axial thickness of the radial portion 23 of the boss 20 gradually decreases as moving away radially from its axial apex 24 in the direction of its outer edge.

Optionally, the first end 11 of the tube T can also have, at the interface with the wall 12, a duct 25 of convergent frustoconical section whose section gradually decreases (converges) from the wall 12 to the second end of the tube T (that is to say in the direction of flow of the pressurized air in the tube T. In this case, the internal diameter $D_B$ of the boss 20 increases gradually along the frustoconical duct 25 up to the hole 12, where the internal diameter $D_{B0}$ of the boss 20 in the plane of the side wall 12 is strictly smaller than the diameter of the hole 13 formed in the wall 12. The radial portion 23 then extends radially from the duct portion 26 of the boss 20.

The boss 20 can be added and fixed in the tube T and where appropriate against the side wall 12 (see for example FIG. 3). The boss 20 then has the shape of a sleeve comprising an axial portion 22, an outer axial face of which is substantially cylindrical of revolution and configured to come into surface contact with the inner surface of the first end 11 of the tube T. Where appropriate, when the boss 20 continues in the supply housing B, the radial portion 23 comprises a downstream radial face configured to come into surface contact with the inner surface of the side wall 12 of the supply housing B.

In this embodiment, the first end 11 therefore has a variable thickness at the boss 20.

The boss 20 can be fixed by bonding, screwing, brazing or any other suitable fixing means in the tube T and/or against the side wall 12 of the supply housing.

This embodiment has the advantage of being able to be applied to existing cooling devices 10, without requiring their structural modification.

Alternatively (not illustrated in the figures), the boss 20 is monolithic with the first end 11 and where appropriate the side wall 12. For that, the boss 20 can be obtained by deformation (stamping, machining, etc.) of the wall of the tube T at its first end 11 and where appropriate of the side wall 12 or during the manufacture of the tube T (typically by 3D printing). The thickness of the first end 11 of the tube T and where appropriate of the side wall 12 at the hole 13 is then substantially constant at the boss 20. Alternatively, the boss 20 is obtained by local increase of the thickness of the tube T at its first end 11 and where appropriate of the side wall 12 around the hole 13.

The axial portion 22 of the boss 20 is therefore monolithic with the side wall 12 of the housing B while its radial portion 23 is monolithic with the tube T. Optionally, the tube T and the side wall 12 of the supply housing B can also be monolithic.

This embodiment therefore involves directly modifying the supply housings B and the first ends 11 of the tubes T.

It will be noted that, in the invention, the geometry of the tube T and where applicable of the supply housing B is localized and therefore does not fundamentally modify the thermo-mechanical behavior of the cooling device 10. In addition, no arrangement is necessary for the connection of the supply housing B and the tubes T. Finally, the geometry of the tube T allows reducing the flow rate taken for the cooling and thus improves the engine performance.

The invention claimed is:

1. An air-jet cooling device for a casing of a turbomachine, the air-jet cooling device comprising:
   a cooling air housing having a wall;
   a tube having a first end mounted on the wall of the housing so as to put the tube into fluid communication with the housing, a plurality of orifices being formed in a wall of the tube in order to eject the cooling air coming from the housing on the casing,
   wherein
   the tube comprises a section at the first end with a gradual variation that defines a boss, said boss having a curved surface configured to be immersed in the cooling air so as to avoid a detachment of a boundary layer of the cooling air at an interface between the first end of the tube and the housing.

2. The cooling device according to claim 1, wherein the curved surface of the boss has no ridges.

3. The cooling device according to claim 1, wherein the section successively comprises, from an interface between the first end of the tube and the wall of the housing and in a direction of flow of the cooling air in the tube, a gradually convergent section and a gradually divergent section.

4. The cooling device according claim 1, wherein the boss has a variable thickness.

5. The cooling device according to claim 1, wherein the boss is added and fixed to the first end of the tube or monolithic with the tube and the housing.

6. The cooling device according to claim 1, wherein the boss has a housing section with a narrowing portion which extends into the housing.

7. The cooling device according to claim 6, wherein the narrowing portion of the housing section has a section which gradually decreases as moving away from the tube.

8. The cooling device according to claim 1, wherein the first end of the tube comprises a frustoconical wall that is connected to the wall of the housing, the frustoconical wall having a section which gradually converges from the wall of the housing towards the tube, the boss further comprising a frustoconical wall portion which has a variable thickness and which extends along the frustoconical wall.

9. The air-jet cooling device of claim 1, wherein the casing of the turbomachine is a turbine casing.

10. A turbine of a turbomachine the turbine comprising a casing and an air-jet cooling device for the casing, wherein the air-jet cooling device comprises;
    a cooling air housing having a wall;
    a tube having a first end mounted on the wall of the housing so as to put the tube into fluid communication with the housing, a plurality of orifices being formed in a wall of the tube in order to eject the cooling air coming from the housing on the casing, wherein the tube comprises a section at the first end with a gradual variation that defines a boss, said boss having a curved surface configured to be immersed in the cooling air so as to avoid a detachment of a boundary layer of the cooling air at an interface between the first end of the tube and the housing.

11. A turbomachine comprising a turbine having a casing and an air-jet cooling device for the casing, wherein the air-jet cooling device comprises;
    a cooling air housing having a wall;
    a tube having a first end mounted on the wall of the housing so as to put the tube into fluid communication with the housing, a plurality of orifices being formed in a wall of the tube in order to eject the cooling air coming from the housing on the casing, wherein the tube comprises a section at the first end with a gradual variation that defines a boss, said boss having a curved surface configured to be immersed in the cooling air so as to avoid a detachment of a boundary layer of the cooling air at an interface between the first end of the tube and the housing.

12. The turbomachine of claim 11, wherein the turbine drives a fan.

* * * * *